(12) United States Patent
Jung et al.

(10) Patent No.: US 7,466,474 B2
(45) Date of Patent: Dec. 16, 2008

(54) MICROMECHANICAL DEVICE WITH TILTED ELECTRODES

(75) Inventors: Denis Jung, Dresden (DE); Christian Drabe, Dresden (DE); Harald Schenk, Dresden (DE); Thilo Sandner, Dresden (DE); Thomas Klose, Dresden (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 12/058,876

(22) Filed: Mar. 31, 2008

(65) Prior Publication Data

US 2008/0239446 A1    Oct. 2, 2008

(30) Foreign Application Priority Data

Apr. 2, 2007  (DE) ................ 10 2007 015 723
Mar. 6, 2008  (DE) ................ 10 2008 012 825

(51) Int. Cl.
*G02B 26/00* (2006.01)
*G02B 26/08* (2006.01)

(52) U.S. Cl. .................... 359/290; 359/198
(58) Field of Classification Search ................ 359/198, 359/212–214, 223, 224, 290, 295, 298
See application file for complete search history.

(56) References Cited

U.S. PATENT DOCUMENTS 6,891,650 B2    5/2005  Mizuno et al.
6,985,279 B1 *  1/2006  Fu ............................. 359/291
7,078,778 B2    7/2006  Schenk
2004/0141894 A1  7/2004  Mizuno et al.
2004/0183149 A1  9/2004  Schenk

FOREIGN PATENT DOCUMENTS

| EP | 1 123 526 B1 | 7/2002 |
| EP | 1 659 437 A2 | 5/2006 |
| JP | 2004-219839 A | 8/2004 |

OTHER PUBLICATIONS

Kim et al.: "Microfabricated Torsional Actuators Using Self-Aligned Plastic Deformation of Silicon," Journal of Microelectromechanical Systems; vol. 15; No. 3; pp. 553-562; Jun. 2006.

Hah et al.: "Theory and Experiments of Angular Vertical Comb-Drive Actuators for Scanning Micromirrors," IEEE Journal of Selected Topics in Quantum Electronics; vol. 10; No. 3; pp. 505-513; May/Jun. 2004.

Schenk et al.: "Micro-Opto-Electro-Mechanical Systems Technology and its Impact on Photonic Applications," J. Microlithography, Microfabrication, and Microsystems; vol. 4; No. 4; pp. 1-11; Oct.-Dec. 2005.

* cited by examiner

*Primary Examiner*—William C Choi
(74) *Attorney, Agent, or Firm*—Keating & Bennett, LLP (57) ABSTRACT

A micromechanical device includes a micromechanical functional structure, which can be deflected about a main axis from a rest position, a movable electrode, which is mounted to the micromechanical functional structure, and a fixed electrode, which can be tilted about a tilting axis with respect to the movable electrode in the rest position, wherein the tilting axis is parallel to the main axis or is identical with the main axis.

23 Claims, 10 Drawing Sheets

MICROMECHANICAL DEVICE WITH TILTED ELECTRODES

CROSS-REFERENCE TO RELATED APPLICATIONS

This application claims priority from German Patent Application No. 102007015723.3, which was filed on Apr. 2, 2007, and from German Patent Application No. 102008012825.2, which was filed on Mar. 6, 2008, which are both incorporated herein in their entirety by reference.

TECHNICAL FIELD

The present invention relates to a micromechanical device with an electrostatic electrode drive, for example a comb electrode drive.

BACKGROUND

A multiplicity of micromechanical actors and sensors are based on the utilization of electrostatic forces for achieving deflection of a functional structure and/or on capacitive methods for determining a deflection of the functional structure. In many cases, deflection of a body, which is movably suspended via one or more springs, is necessary for accomplishing the functionality of the actor and/or sensor, wherein the deflection of the body should be possible at least in two dimensions. In general, translatory and/or rotatory movements, i.e. rotational movements, are possible. In order to achieve this, various static electrodes, which can be contacted electrically in independent manner from each other, may be arranged below the movable body, so that the body, depending on between which static electrode and the movable body an electric voltage is applied, is deflected in the direction of the respective static electrode and/or the externally induced motion of the body can be detected capacitively.

Such an arrangement is described in U.S. Pat. No. 7,078,778 B2. What is disadvantageous in such an arrangement is the relatively complex construction as well as the connection technology of the arrangement. In general, such devices may also be tested only after a dicing process of the device, which leads to faulty devices being discovered relatively late in the fabrication process, which may be connected to significant costs. The above-mentioned arrangement further necessitates relatively high electric voltages, and geometric restrictions result for the deflection angle of the deflectable body due to the construction. With too large deflections and/or with external disturbances, e.g. by oscillations or external force impact (shock), there is the risk of the so-called pull-in, which may result in undesired deflection of the electrode arrangement, which may even lead to mutual contact of the electrode arrangement, leading to the destruction of the micromechanical device in the extreme case.

With the aid of comb electrodes or electrode combs, which comprise a multiplicity of so-called fingers, relatively great forces and/or moments can be generated. This is due to the fact that the distance of the comb electrodes typically is two to ten micrometers, and thus relatively small. At the same time, a relatively high capacitive change on movement of the electrode combs against each other can be taken advantage of through the comb-shaped arrangement of the electrode fingers, which interdigitate without touching in the normal case of operation.

In EP 1 123 526 A, there is described an arrangement in which movement out of the chip plane is to be generated. What is described there is an arrangement in which fixed electrode combs and movable electrode combs are produced in a layer and are not juxtaposed with respect to each other in offset manner. In this construction, static deflection of the suspended body cannot be achieved. Rather, this approach can only be used for resonantly operated devices, such as resonantly operated scanner mirrors. In resonantly operated scanner mirrors, the scanner mirror is energized by applying a suitable time-dependent voltage of a certain frequency in periodic intervals for maintaining the oscillation of the scanner mirror.

A series of publications describe scanner mirrors in which the comb electrodes are arranged in offset manner with respect to each other. Fixed electrode combs are connected to the chip frame. Movable combs are connected either to the mirror plate, or the micromechanical functional structure in general, or directly to a spring, which holds the structure. In parts, the movable combs are also mounted to additional beams or other structural elements, which in turn are connected to the mirror plate, which represents the deflectable suspended body, or to the spring.

In U.S. Pat. No. 6,891,650 B2, there is described a scanner mirror in which the fixed and movable electrode combs are produced in different layers. The two layers are separated from each other by insulating material, e.g. an insulation layer. By way of the construction, the two electrode combs are arranged in parallel and perpendicularly to the chip surface in shifted manner with respect to each other. Upon application of a voltage, the movable comb may now be drawn in the direction of the fixed electrode comb. In a suspension of the scanner mirror via a torsion spring, this takes place in form of a tilt, until an electrostatic moment, which is induced by an electric voltage between the capacities formed by the two electrode combs, and a mechanical restoring moment, which is induced by the torsion spring, are in balance. What is disadvantageous here, apart from the complex processing, which is performed with a so-called deep reactive ion etching (DRIE) multiple etch, above all is the fact that the capacity change, to which the electrostatic moment is directly proportional, decreases particularly with great deflections. Moreover, the construction no longer is symmetrical in a tilt of the mirror plate. This results in the fact that the electrostatic forces are clearly greater in a tilt on the one side of the mirror plate than in a tilt of the mirror plate to the other side. Hence, the maximum electric voltage applicable, and hence the deflection, is restricted, because the above-mentioned pull-in effect may occur at too high a voltage. A similar construction is described in EP 1,659,437 A2.

In JP 2004-219839 A, there is described a construction in which the movable electrodes are not shifted in parallel to the fixed electrodes, but are arranged in tilted manner with respect thereto. To this end, the fixed electrode comb is suspended via a torsion spring in parallel to a torsion axis of the mirror, and may be tilted thereabout. What is disadvantageous in this construction is that the construction no longer is symmetrical when tilting the mirror plate. The electrostatic forces are clearly greater in the tilt on the one side of the mirror plate than in a tilt to the other side. Thereby, the maximum electrical voltage applicable, and hence the deflection, is restricted, because the so-called pull-in effect may occur at too high a voltage between the electrode combs.

J. Kim et al. (Microfabricated Torsional Actuators using self-aligned plastic deformation of silicon", J. Micromechanial Systems, vol. 15, no. 3, June 2006, p. 553 ff) present an approach in which the mirror plate is deflected temporarily via a mandrel. In parallel to the torsion axis of the mirror axis, there is a structure with the movable electrode combs, so that these are tilted with the mirror plate. The construction is then subjected to high-temperature treatment. Here, the torsion spring, which is under mechanical stress, deforms plastically, so that the deflected state remains when cooling also after removal of the mandrel. What is disadvantageous in this variant, however, is the processing. The high temperatures may for example lead to destruction and/or decomposition of aluminum-based conductive traces or also aluminum-based mirrorings. Furthermore, it is to be assumed that the high temperature stress may have negative effects on the curvature of a mirrored plate. In addition, this construction also distinguishes itself by the above-described asymmetry, which may lead to early pull-in of the electrodes.

By D Hah et al. ("Theory and Experiments of Angular Vertical Comp-Drive Actuators for Scanning Micromirros", IEEE JOURNAL OF SELECTED TOPICS IN QUANTUM ELECTRONICS, vol. 10, no. 3, May/June 2004, p. 505 f), there is presented an approach in which the movable combs, which are connected to the torsion spring of the scanner mirror via a polymer, e.g. lacquer or polychlorinated biphenyl (PCB) polymer, are tilted. To this end, a so-called reflow process for the polymer is used, consisting of a temperature treatment in combination with a chemical treatment. In this process, the movable combs, which are connected to the torsion spring of the scanner only via the polymer hinge, are deflected. What may be disadvantageous here is the use of polymers, with respect to the reliability. In particular, varying humidity, radiation of light, and aging may lead to failure of the hinges and to a significant temperature dependency of the tilting angle. In addition, this construction also distinguishes itself by the above-described asymmetry, which may lead to early pull-in.

Apart from the electrostatic drives, there exist a series of devices based on piezoelectric, thermal or magnetic drives. Piezoelectric drives are more difficult to integrate than electrostatic drives. Particularly when complementary metal oxide semiconductor (CMOS) process compatibility is necessary, the choice of possible materials becomes limited. Other efficient piezoelectric materials, such as lead zirconate titanate (PZT), have spontaneous polarization decreasing with time. For this reason, renewed polarization must take place at elevated temperatures at certain time intervals. For many applications, this is not feasible. Other materials, such as aluminum nitride (AlN), indeed have spontaneous polarization invariable over time and CMOS compatibility, but possess significantly smaller piezoelectric constants than PZT. Hence, the efficiency is not sufficient in many cases.

Thermals drives, which are based on the bimorph effect, per se have a dependence of the drive on the ambient temperature. This must than additionally be compensated for via regulation. For applications that have to cover a large temperature range, such as in the automotive area, these actors generally are not suited.

Magnetic drives have sufficiently high efficiency (for example Bimag by Microvision). The device as such, however, is significantly more complex than in the case of an electrostatic drive. While all components can be integrated in the electrostatic drive, an external magnet is employed in the magnetic drive. Not only is this cost-intensive, but also has to be accurately aligned, and further significantly enlarges the overall construction. Moreover, such a magnetic drive may have comparably high power consumption.

SUMMARY

According to an embodiment, a micromechanical device may have a micromechanical functional structure, which can be deflected about a main axis from a rest position, a movable comb electrode, which is mounted to the micromechanical functional structure, and a fixed comb electrode, which can be tilted about a tilting axis with respect to the movable comb electrode in the rest position, wherein the tilting axis is parallel to the main axis or identical with the main axis.

In embodiments of the invention, the micromechanical functional structure is deflectable in quasi-static manner.

In embodiments of the invention, the construction of the fixed and movable electrode combs is formed so that the capacity change in the working range of the micromechanical device is as constant as possible. To this end, the tilting of the electrode combs with respect to each other takes place such that, with suitably high deflection of a mirror plate of a scanner mirror, again a coplanar arrangement of the fingers of the electrode combs results. In embodiments of the present invention, the tilting axis of the fixed electrode combs and/or the second comb electrode is put as closely as possible to a rotation axis and/or main axis of the micromechanical device.

In further embodiments of the present invention, the electrode fingers of a first comb electrode are attached at a torsion spring, which forms the movable first electrode comb. The second fixed electrode comb structure is suspended by means of springs so that it can be tilted about an axis identical with the torsion axis of the micromechanical functional structure and/or lying very closely to the torsion axis of the micromechanical functional structure. The capacity change may thus be kept approximately constant in a wide range. In further embodiments of the present invention, suspension of the fixed electrode combs, i.e. the second comb electrodes, may be formed so that the electrode combs may be tilted both upward, i.e. above the frame structure, and downward, i.e. below the frame structure. Hence, it is possible to form the construction symmetrically to the torsion axis, even with deflected micromechanical functional structure. The electric pull-in then occurs only at higher voltages in this direction due to the symmetry.

BRIEF DESCRIPTION OF THE DRAWINGS

Embodiments of the present invention will be detailed subsequently referring to the appended drawings, in which.

DETAILED DESCRIPTION

Although comb electrodes are set forth and illustrated in the following embodiments, this does not represent any limitation of the usable electrodes or electrode shapes. Rather, the embodiments also relate to electrode shapes and electrode types of different shapes of designs. The embodiments thus not only relate to comb electrodes with respect to the electrodes used.

Figure 1:
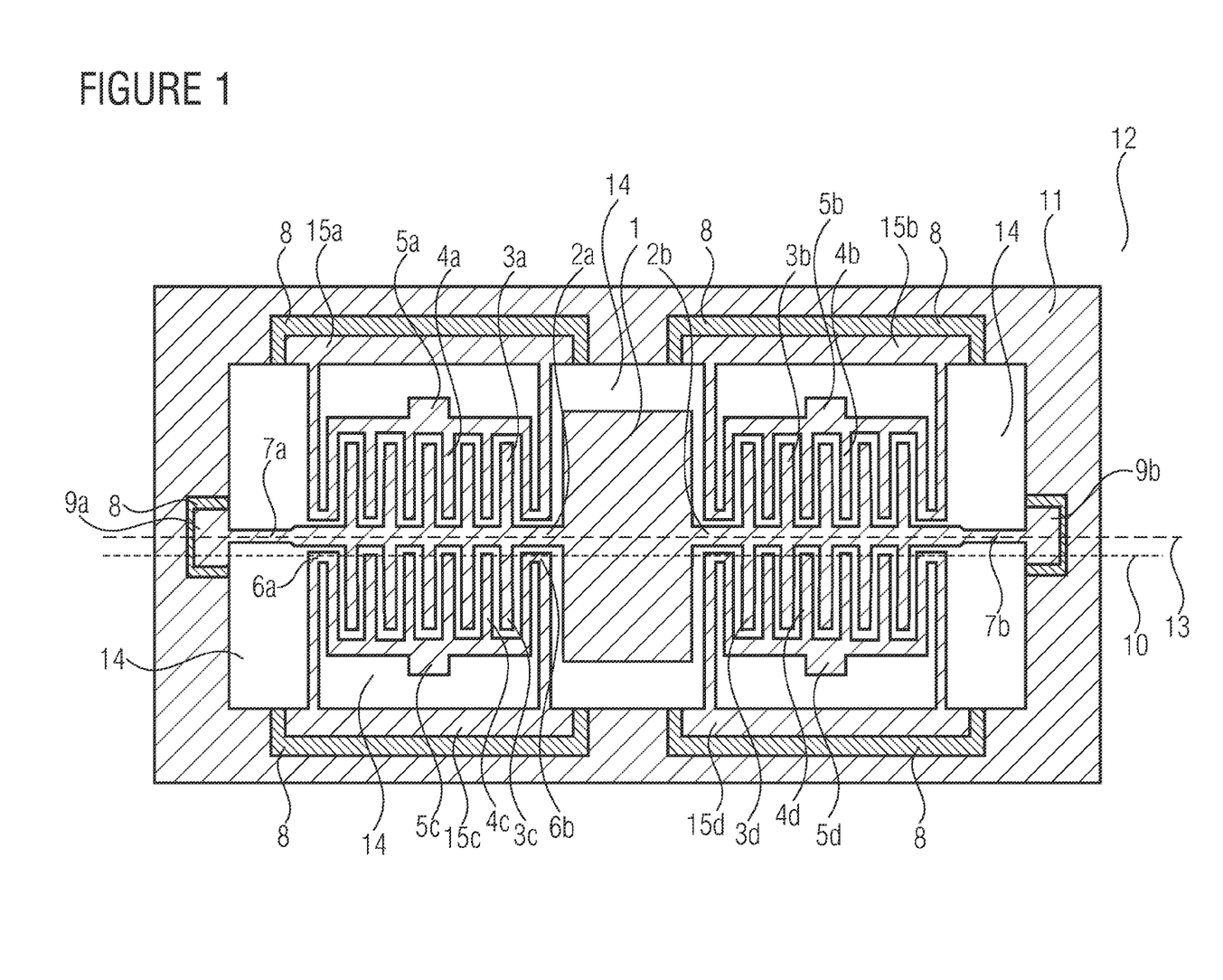
FIG. 1 is a plan view illustration of a one-dimensional scanner device according to an embodiment of the present invention.

FIG. 1 shows a plan view illustration of a one-dimensional scanner device according to an embodiment of the present invention. The scanner device 12 includes a scanner mirror 1 as micromechanical functional structure, which is arranged in a frame structure 11. The scanner mirror 1 is deflectable about a main axis 13. The scanner device includes beam-shaped portions 7a, 2a, 2b, 7b, which are arranged along the main axis 13 and connect the scanner mirror 1 to the frame 11. Movable electrodes, here for example movable comb electrodes 3a-3d, are arranged on the portions 2a, 2b. The comb electrodes move together with the scanner mirror. Furthermore, the scanner device includes fixed electrodes, which are formed as fixed comb electrodes 4a-4d here. These are mounted to the frame. The fixed comb electrodes 4a-4d can be tilted about a tilting axis (illustrated by the auxiliary line 10 in FIG. 1), which is adjacent to the main axis 13.

The embodiment illustrated in FIG. 1 is a one-dimensional scanner mirror 12, which may be produced in the so-called silicon-on-insulator (SOI) technology. The frame structure 11 may also be silicon, and the areas 14 illustrated in FIG. 1 may correspondingly represent trenches having been produced by etching in an upper monocrystalline layer of a SOI wafer. One possible fabrication technology is illustrated e.g. by H. Schenk et al. ("Micro-Opto-Electro-Mechanical-Systems Technology and its impact on photonic applications", J. Microlithography, Microfabrication and Microsystems, vol. 4, no. 4, p. 41501-11 (2005)). The micromechanical functional structure 1 may be the mirror plate of a scanner mirror 12, wherein the mirror plate 1 is illustrated without mirroring in FIG. 1. Usually, however, a mirroring of a metal layer, of an annealed metal layer, or of a dielectric layer stack is used. The mirror plate 1 is suspended via the structures 7a, 2a, 2b, 7b and connected to the chip frame 11 via the anchors 9a and 9b. By the anchors 9a and 9b and the structures 7a, 2a, 2b and 7b, the main or torsion axis indicated by the auxiliary line 13 in FIG. 1 is defined. The anchors 9a and 9b and the anchors 15a to 15d are formed by the monocrystalline SOI layer having been removed by etching around the anchors. Hence, a buried oxide layer 8 of the SOI wafer remains. The anchors each rest upon this oxide layer 8 and thus are fixedly connected to the chip frame 11. The SOI layer is used as electrical conductor.

Hence, it is highly n- or p-doped in suitable manner. By using the open trenches 8 etched around the anchors, the respective anchors and the structures connected thereto are electrically insulated. With the aid of a pad (bond pad) on the anchor, the electrical contacting from the outside, e.g. to the housing, may take place. Each of the fixed combs 4a to 4d and the movable combs 3a to 3d may thus be set to a separate electrical potential.

In the embodiment of FIG. 1, the structures 7a and 7b have a smaller width than the structures 2a and 2b. When using a suitable production technology, the thickness of the structures 7a and 7b may be less than that of the structures 2a and 2b. The structures 7a and 7b may be torsion springs. Through the smaller thickness, the rigidity of the torsion springs 7a and 7b can be kept significantly lower than the rigidity of the thicker structures 2a and 2b. The movable fingers forming the electrode combs 3a to 3d are attached at these structures 2a -2b. In this connection, movable means that the first electrode combs 3a to 3d are connected to the mirror plate 1 via the axis and hence are deflectable with the mirror plate 1. The advantage of the lower rigidity of the springs 7a and 7b as compared with the structures 2a and 2b is that all fingers of the combs 3a to 3d are deflected almost equally far with the deflection of the mirror plate 1. If the rigidity of 7a and 7b is not significantly lower than that of the structures 2a and 2b, significant torsion also occurs in 2a and 2b, so that the fingers can be deflected the less, the further they are away from the mirror plate 1. This effect may be utilized for achieving a desired course of a capacity between the electrode combs.

The fixed, tiltable second comb electrodes 4a to 4d form, together with the movable comb electrodes 3a to 3d, a capacity the value of which depends on the deflection of the mirror plate and the movable combs 3a to 3d connected thereto. In this connection, fixed means that the comb electrodes 4a-4d usually are tilted once in the manufacture of the device and remain fixed in this position thereafter. The scanner mirror 12 further comprises pads 5a to 5d, via which a force can be introduced perpendicularly to the chip surface either from the bottom side or the topside of the scanner mirror. If a force is introduced to the pad 5c from above, the fixed tiltable electrode comb 4c rotates about the auxiliary line 10 drawn in dashed manner. This is achieved by torsion springs 6a and 6b, which have sufficiently low rigidity, so that all potentially occurring bending effects of the suspension may generally be neglected. To this end, the width and/or the thickness of the torsion springs 6a and 6b may be kept small, among other things. If such bending effects cannot or are not to be neglected, this effect is to be taken into account in the design of the electrode combs. The torsion axis 10 for the bending of the fixed combs is in immediate proximity to the torsion axis 13 of the mirror plate 1, which is given by the structures 2a, 7a, 2b and 7b as well as the anchors 9a and 9b. Thereby, a capacity change taking place upon movement of the movable combs 3a-3d to the fixed combs 4a-4d can be designed to be approximately constant in the working range, i.e. in the angle range in which the mirror plate 1 of the scanner mirror 12 is tilted.

The deflection of the fixed electrode combs 4a to 4d out of the frame structure 11 may be e.g. by mandrels, which are integrated in the packaging of the scanner mirror, and/or by the force impact of a micromanipulator. Here, the mandrels and/or needles may either act from the topside of the device 12, from the bottom side of the device 12, or both from the topside and the bottom side on the pads 5a to 5d. The electrode combs may thus be deflected upward or downward. In this manner, comb arrangements also symmetrical with respect to the torsion axis 13 can be produced, which are significantly more insensitive to the above-mentioned pull-in effects than asymmetrical constructions.

Furthermore, it is possible to perform the deflection of the second comb electrodes $4a$ to $4d$ not in the packaging but within the scope of a construction and connection technique (AVT, AVT=Aufbau–und Verbindungstechnik) temporarily and then connect the pads or maybe additionally attached auxiliary structures (which are not shown in FIG. 1) to a package bottom or a package lid in which the micromechanical device is attached. As connection techniques, for example gluing techniques, low-temperature solder, bonding, welding, adhesive forces or simple mechanical latching in corresponding structures are suited. Applying metal or polymer layers, for example by printing techniques (inkjet), onto the chip surface for fixing the combs also is possible.

Furthermore, it is possible to realize the deflection and/or tilt of the combs $4a$ to $4d$ by special actors integrated in the micromechanical device. The functioning of the actors may be based on the thermal, the electrostatic, the electromagnetic or the piezoelectric principle of action. The deflection of the comb electrodes $4a$ to $4d$ may then be maintained in operation by the actors, or only temporarily within the scope of the construction and connection technique, when working with the above-mentioned connection techniques.

Furthermore, the bimorph effect may also be used. To this end, a thermal oxide or a nitride layer may be applied onto a thin substrate layer, for example of silicon. In both cases, intrinsic layer tensions, or the tension of the layers, lead to a bend, which may lead to the desired deflection with suitable design of the comb suspensions. The comb structures deflected in this manner may then be fixed again after the above-described methods.

Figure 2:
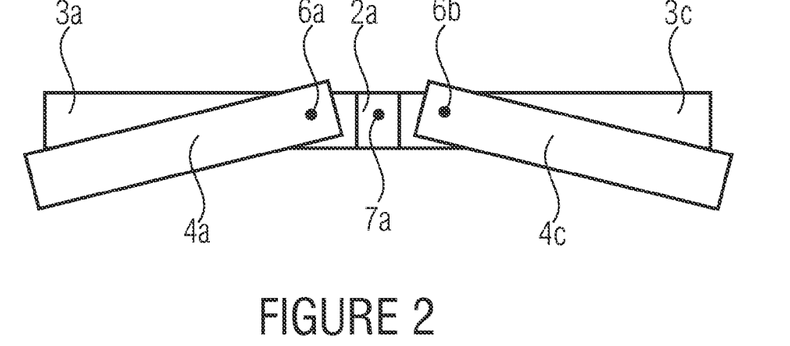
FIG. 2 is a cross-sectional illustration of the electrode combs of the scanner device from FIG. 1.

A schematic cross-section of the comb electrodes from FIG. 1 is illustrated in FIG. 2. The torsion axis 13, which is formed by the torsion springs $7a$, $7b$ and the structures $2a$, $2b$, is to be seen as a black dot at the center. Next to it, there are the torsion axes $6a$ and $6b$ adjacent and/or parallel to the main axis 13. The second comb electrodes $4a$, $4c$ are illustrated in tilted fashion with respect to the first comb electrodes $3a$ and $3c$ around the torsion axes $6a$ and $6b$. The movable comb electrodes $3a$ and $3c$ are attached to the structure $2a$, which is arranged centrally with respect to the torsion axis 13. Since it is a cross-section, only one finger of the corresponding comb electrode each is illustrated of the electrode combs $3a$, $3c$ and/or $4a$, $4c$. From the figure, it becomes obvious that the tilting axes $6a$ and $6b$ of the fixed combs $4a$, $4c$ lie very closely to the torsion axis 13 of the mirror plate 1. Thereby, it may be achieved that the capacity change of the electrode combs with respect to each other is as constant as possible in a tilt of the movable combs with respect to the fixed combs in the working range. To this end, it is useful that the tilting axis of the combs lies as closely as possible to the rotation axis of the scanner mirror.

Figure 3:
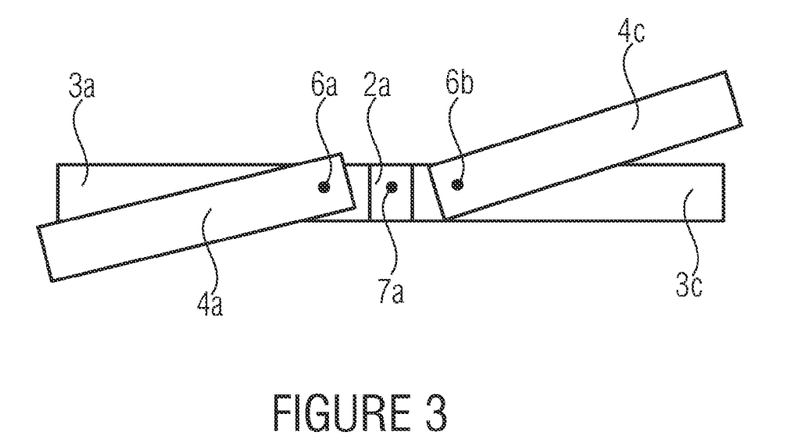
FIG. 3 is a cross-sectional illustration of the electrode combs of the scanner device from FIG. 1 according to a further embodiment of the present invention.

In FIG. 3, a further embodiment of the present invention is illustrated. What is shown there is again a cross-section of the one-dimensional scanner mirror from FIG. 1 with its comb electrodes. In this embodiment, one of the fixed comb electrodes $4a$ is tilted downward via the torsion axis $6a$, which is arranged adjacent to the main axis 13 of the micromechanical device, whereas the fixed electrode comb $4c$ is tilted upward via the rotation axis $6b$, which is also arranged adjacent to the main axis 13. Through this way of arranging the fixed combs with respect to the movable combs $3a$, $3c$, which may be deflected about the main axis 13 with the structures $7a$ and $2a$, the construction may also be designed to be symmetrical to the torsion axis 13 with deflected mirror plate 1. An electric pull-in effect then only occurs at higher voltages due to the symmetry. An electrical voltage for controlling the mirror plate between the comb electrodes may be significantly higher in an arrangement of the fixed comb electrodes according to the above embodiment than in the case of an asymmetrical construction of the scanner mirror structure. In this connection, a symmetrical construction means that the deflection of the movable comb electrode together with the fixed comb electrodes $4a$ and $4c$ tilted upward and downward causes almost identical capacity change upon rotation of the movable comb electrodes $3a$ and $3c$ about the torsion axis 13 in clockwise or anti-clockwise manner.

Figure 4:
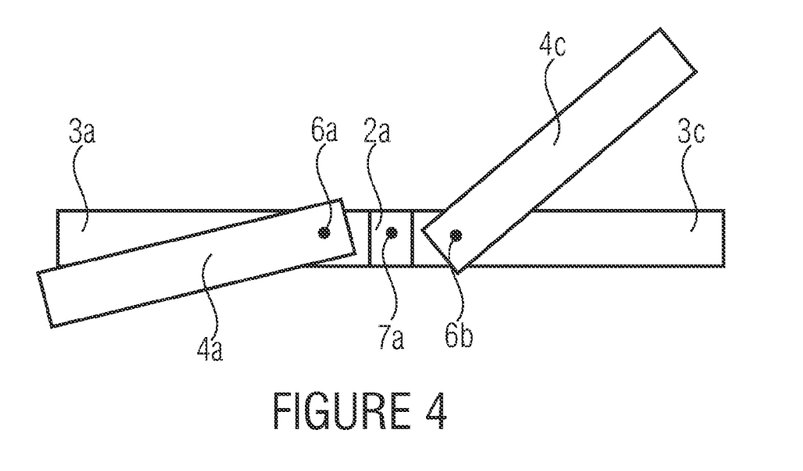
FIG. 4 is a cross-sectional illustration of the electrode combs of the scanner device from FIG. 1 according to another embodiment of the present invention.

In FIG. 4, as a further embodiment of the present invention, a cross-sectional illustration of the electrode combs from FIG. 1 is illustrated. In this embodiment, the fixed comb electrodes $4a$ and $4c$ are not arranged multi-axis-symmetrically (FIG. 2) or point-symmetrically (FIG. 3) to the main axis 13, but asymmetrically. The tilt of the fixed second comb electrodes $4a$ and $4c$ about the respective torsion axes $6a$ and $6b$ is by a different rotation angle. For example, the second comb electrode $4a$ may be deflected downwardly and the comb electrode $4c$ having a greater angle upwardly, as illustrated in FIG. 4. Thereby, it may be achieved that the electrical torque acting due to the capacity change at a movement of the first comb electrodes $3a$ and $3c$ with respect to the fixed comb electrodes $4a$ and $4c$ is distributed over a larger angle range. With this, a larger working range of the scanner mirror can be attained. In a chip, along the main axis, there may be arranged several fixed combs electrically and mechanically separated from each other, which are arranged at different angles with respect to the chip surface. Thereby, the available torque can be distributed over an even larger angle range.

Figure 5:
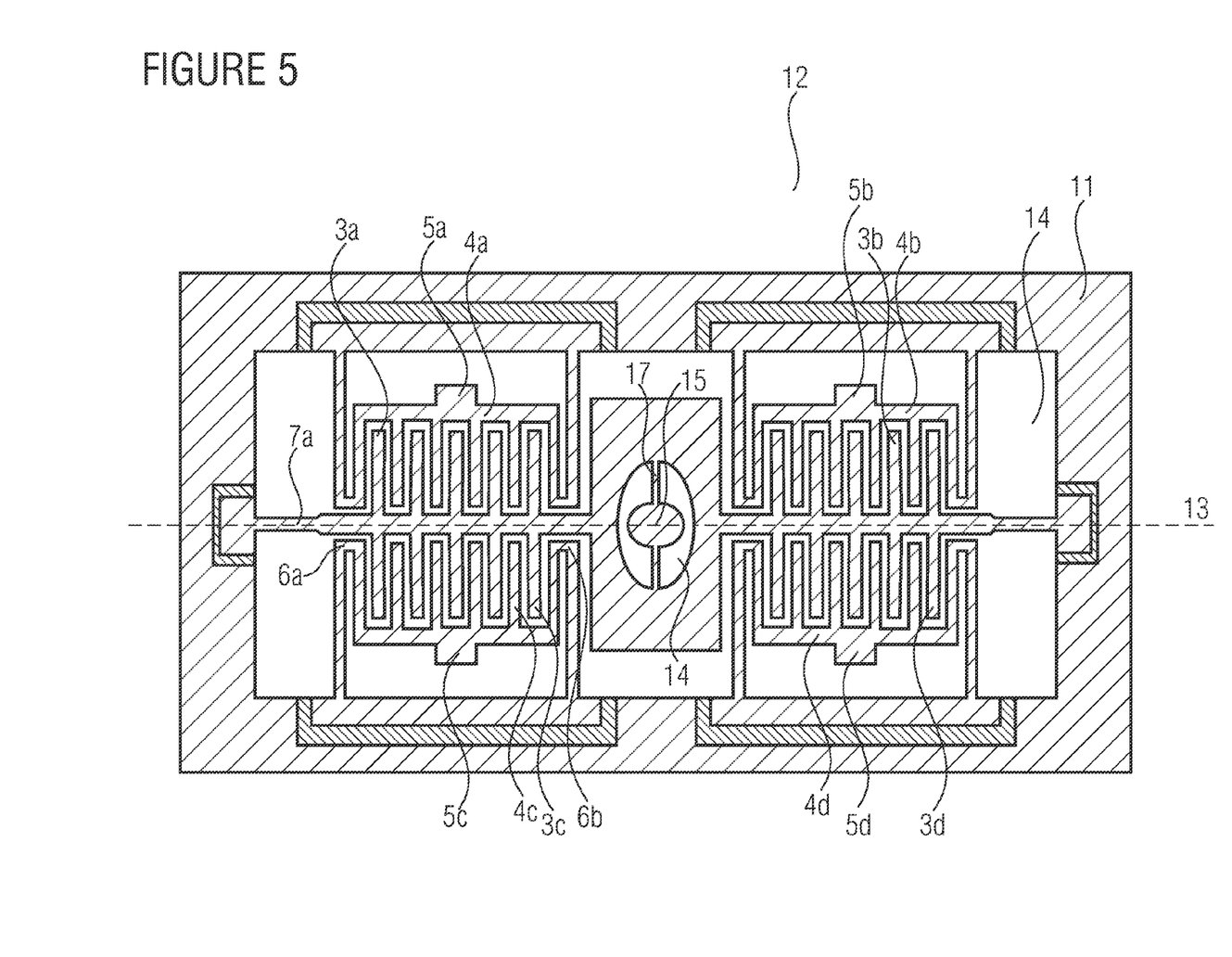
FIG. 5 is a plan view illustration of a two-dimensional scanner device according to again another embodiment of the present invention.

FIG. 5 shows a further embodiment of the present invention, which substantially corresponds to the embodiment described in FIG. 1. For this reason, the reference numerals used in the following correspond to the corresponding structures as were shown in FIG. 1. The embodiment illustrated in FIG. 5 is, as opposed to FIG. 1, however, a two-dimensional scanner. The two-dimensional scanner may be realized by a mirror plate 15 being suspended within the plate 1, namely such that the torsion axis 17 of the mirror plate 15 passes perpendicularly to the torsion axis 13 of the external structure. The mirror plate 15, which is suspended within the plate 1, may be deflected and/or operated for example with the aid of the electrostatic, thermal, magnetic or piezoelectric principle of action. The mirror plate 15 may be operated in resonant or quasi-static manner. In the resonant case of operation, the mirror plate 15 may be imparted with a voltage in periodic intervals (corresponding to a resonant frequency of the torsion oscillation), in order to oscillate the mirror plate 15 or maintain oscillation thereof. For the deflection of the comb electrodes $4a$ to $4d$, the behavior illustrated in the previous embodiments applies. Fingers or electrode comb structures, which then interdigitate with fingers or electrode comb structures connected to the chip frame 11 (not illustrated in FIG. 5), may be attached at the plate 1 for enlarging the electrostatic torque. These may also be electrically insulated by means of a further trench 8, as shown in FIG. 1, in the chip frame 11 and separately contacted via bond pads. The moment course may thereby be indeed deteriorated slightly for the quasi-static deflection, but for a resonant operation more energy can be fed into the system, which may lead to higher deflection and hence a greater working range of the scanner. The electrode combs mounted to the chip frame may be deflected or remain in the chip frame, similar to the above-described fixed combs $4a$ to $4c$.

Figure 6:
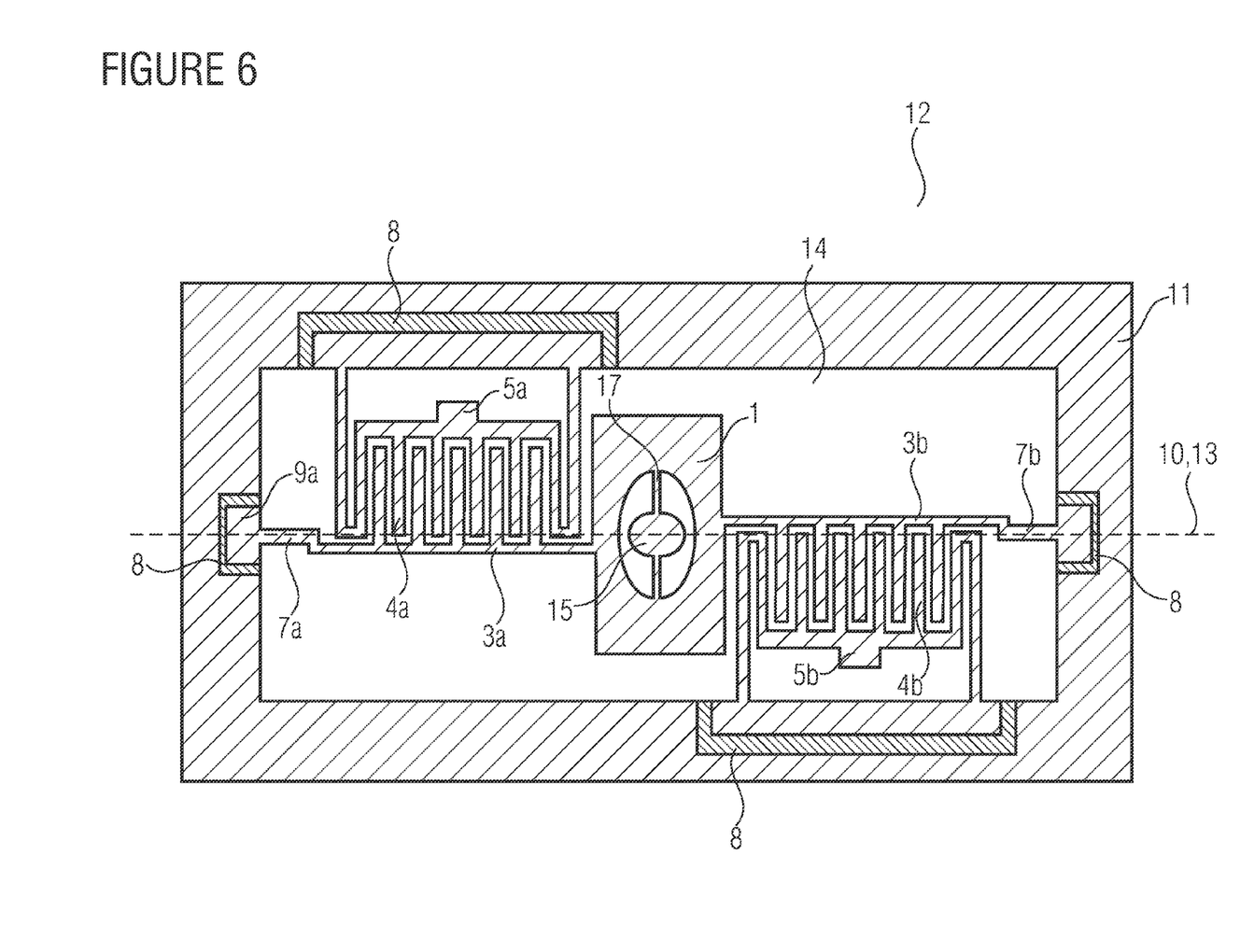
FIG. 6 is a plan view illustration of a two-dimensional scanner structure according to an embodiment of the present invention in which the torsion axis and the tilting axis of the fixed comb electrodes are identical.

FIG. 6 shows a plan view illustration of a two-dimensional scanner structure according to an embodiment of the present invention, in which the torsion axis and the tilting axis of the fixed comb electrodes are identical. By the offset of the micromechanical functional structure, which contains the movable electrode combs 3a and 3b, with respect to the torsion axis 7a and 7b with the corresponding anchor structures 9a and 9b, it is indeed achieved that the tilting axis 10 of the combs lies exactly on the torsion axis 13 of the plate. Through this arrangement, it can be achieved that both the movable and the fixed combs can be tilted about an identical axis. The fixed combs 4a, 4b may, like in the embodiment according to FIG. 1, be tilted about the corresponding torsion springs 6a and 6b, and 6c and 6d, respectively. In this embodiment, the micromechanical device 12 is illustrated as a two-dimensional scanner. For example, a round mirror plate 15 is suspended within the plate 1, namely such that the torsion axis 17 of the round mirror plate 15 passes perpendicularly to the torsion axis 13 of the external structure. The dashed line illustrated in FIG. 6 in this embodiment represents both the tilting axis of the fixed combs 4a and 4b and the torsion axis 13 of the plate 1. Through the above-described arrangement, in which the tilting axis of the combs and the torsion axis of the mirror plate are identical, it can be achieved that the capacity change of the electrode combs in the working range of the two-dimensional scanner mirror is as constant as possible. At a suitably high deflection of the mirror plate, again an almost coplanar arrangement of the fingers of the electrode combs 3a and 3b results with respect to the fingers of the electrode combs 4a and 4b.

Figure 7:
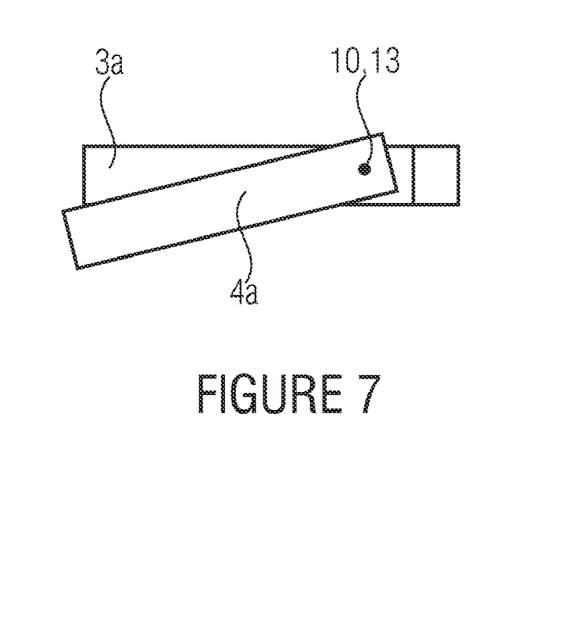
FIG. 7 is a cross-sectional illustration of the comb electrodes of the two-dimensional scanner device from FIG. 6.
Figure 8:
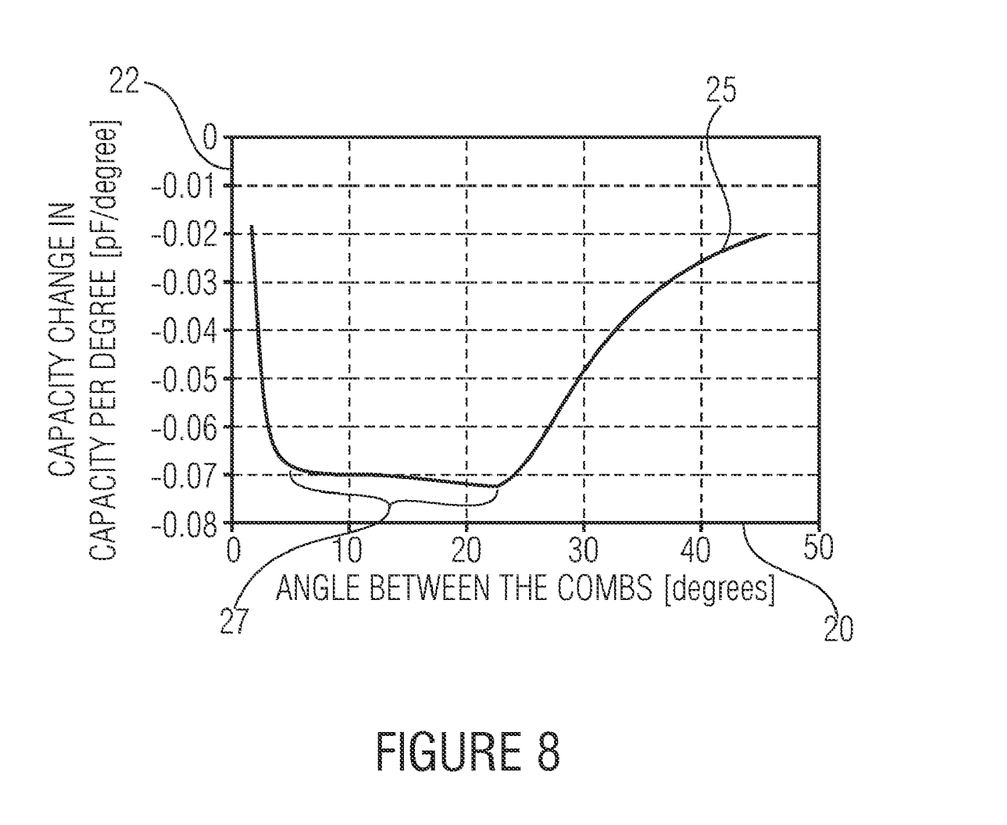
FIG. 8 is a diagram showing the calculated capacity change as a function of the angle between a movable comb electrode and a fixed comb electrode.

FIG. 7 shows a cross-sectional illustration of the electrode combs of the embodiment illustrated in FIG. 6. The black dot 10,13 represents the tilting axis of the fixed combs 4a and 4b on the one hand, and at the same time the torsion axis 13 of the plate 1. By the tilting axis 10 lying on the torsion axis 13, almost constant capacity change at a movement of the mirror plate and the movable comb electrodes 3a and 3b connected thereto is achieved over a wide deflection range. FIG. 8 is a diagram in which the capacity change calculated for such a configuration is plotted as a function of the relative angle between the fixed combs and the movable combs. Beginning with a relative angle of 8°, it can be worked with almost constant capacity change up to a relative angle of 23°. The necessary pre-deflection of the fixed electrode combs with respect to the chip plane is the sum of the desired mechanical deflection of the scanner and the relative angle necessary to achieve the plateau of quasi-constant capacity change. In FIG. 8, by pre-deflection of the fixed electrodes by 23° with respect to the chip plane, activation of the scanner may take place by 15°. In FIG. 8, the capacity change in Picofarad per degree is represented on the y axis 22, whereas the angle between the combs in degrees is represented on the x axis 20. As can be taken from the curve course of the simulated curve 25, approximately constant capacity change between the comb electrodes results over a large angle range 27 when using the structure illustrated in FIG. 6.

Figure 9:
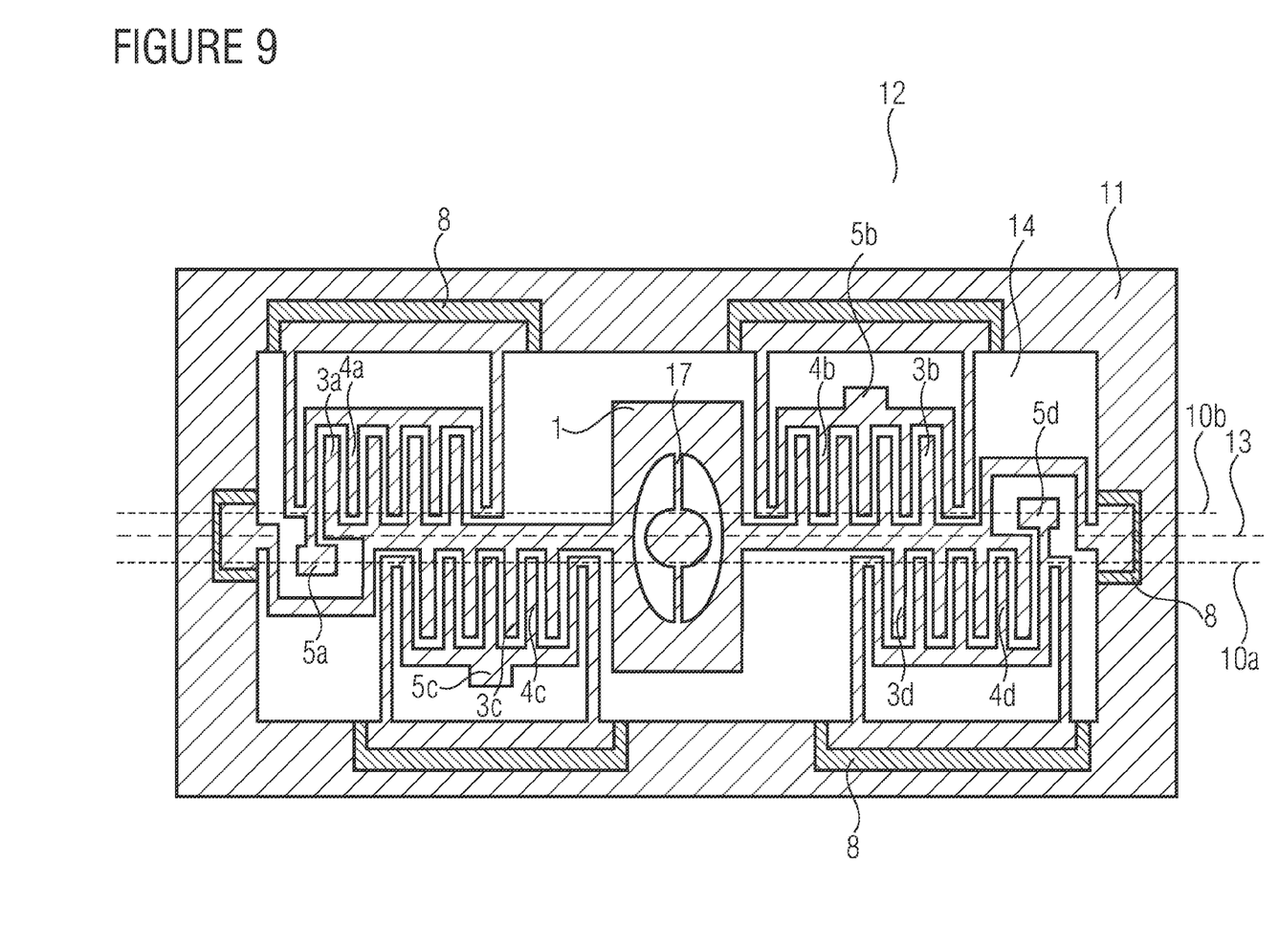
FIG. 9 is a plan view illustration of a two-dimensional micro-scanner for tilting the fixed comb electrodes from the micro-scanner plane and below the micro-scanner plane.

In a further embodiment of the present invention, which is illustrated in FIG. 9, a two-dimensional micro-scanner is shown, in which the fixed electrodes 4a and 4d can be tilted out of the chip plane and the fixed electrodes 4b and 4c below the chip plane by a perpendicular force impact on the pads 5a to 5d. Here, the fixed electrode combs 4a to 4d are deflected about tilting axes illustrated as auxiliary lines 10a and 10b, which lie close to the torsion axis 13. With the structure illustrated in FIG. 9, it is possible to achieve arbitrary direction of the tilt of the electrode combs 4a to 4d at unidirectional force impact on the corresponding pads 5a to 5d and by suitable choice by the design of the structure. With this structure, it can be achieved that fixed comb electrodes are deflected out of the chip plane and/or below the chip plane, without force impact taking place both from above and from below. In particular, the symmetrical arrangement, as it is illustrated in FIG. 3, can be achieved thereby, without having to let a force act from both sides, i.e. from the upper chip side and from the lower chip side. In addition, as already mentioned above, tilting axes of the fixed combs 10 and 10b are in the vicinity of the torsion axis 13, which is desirable with respect to constant capacity change during the deflection.

Figure 10:
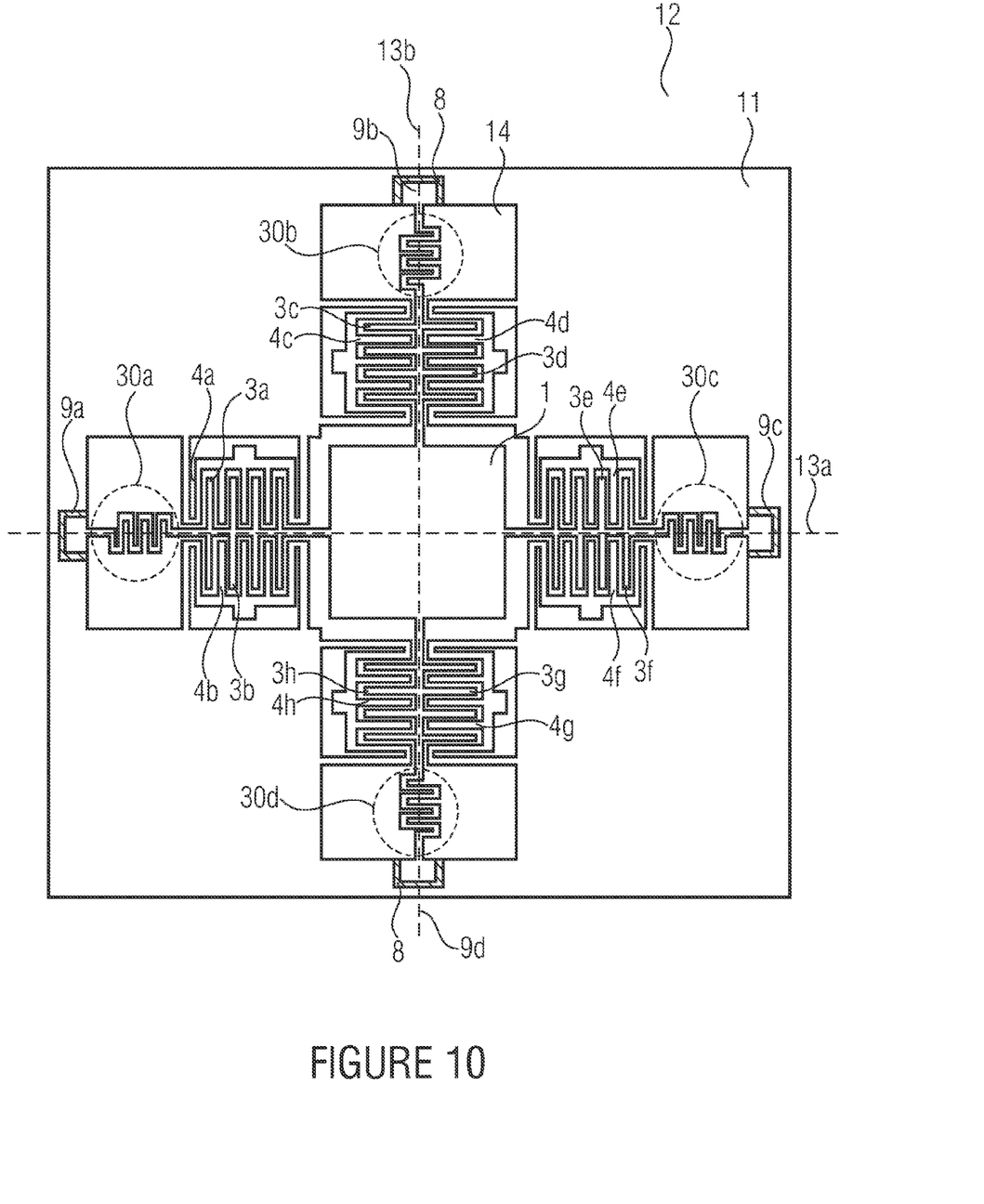
FIG. 10 is a plan view illustration of a micromechanical functional structure with a suspension via four meander-shaped springs.

In FIG. 10, a further embodiment of the present invention is illustrated. In this embodiment, the micromechanical device 12 comprises a plate 1, which is suspended via two main axes 13a and 13b perpendicular to each other, at the ends of which meander-shaped springs 30a and 30d each are located. The main axes 13a and 13b perpendicular to each other are supported in a frame structure 11 via anchors 9a to 9d and correspondingly etched oxide layers 8. As already described above, movable comb electrodes 3a to 3h are located at the main axes, wherein these are arranged so that, by a corresponding voltage change of the associated fixed comb electrodes 4a to 4h, deflection of the plate 1 can be achieved both about the rotation axis 13a or also the rotation axis 13b. The plate 1 may be tilted two-dimensionally. By the meander-shaped springs 30a-30d, also a translatory movement of the plate 1 perpendicular to the main axis 13a or 13b can be achieved.

Figure 11:
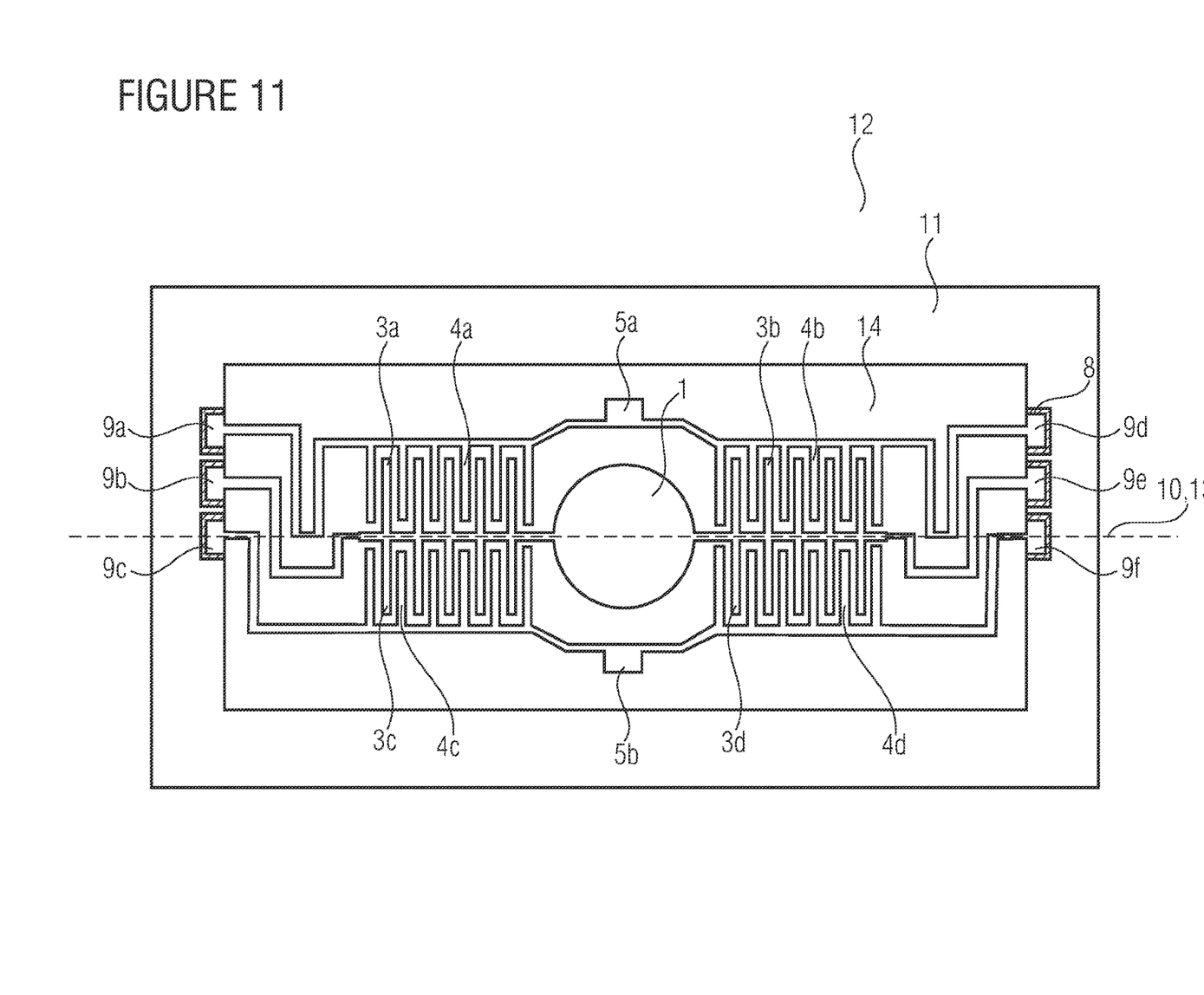
FIG. 11 shows a further embodiment of the present invention, in which four fixed electrode combs are deflectable via two pads.

In FIG. 11, as a further embodiment of the invention, the structure of a micromechanical device 12 is illustrated, which is a one-dimensional scanner mirror. The functioning principle of the illustrated micromechanical functional structure corresponds to the embodiment illustrated in FIG. 1, wherein in this case the fixed combs 4a to 4d can be tilted by a force impact on only the two pads 5a and 5b. In this embodiment, the design of the structure is chosen so that the tilting axis 10 of the fixed combs 4a to 4d again coincides with the torsion axis 13 of the mirror plate 1. So as to be able to realize this structure, in the embodiment illustrated, several anchor structures 9a to 9f are necessary as suspension for the torsion axis 13 and the tiltable and subsequently fixed comb electrodes 4a to 4d. The anchors 9a to 9f may again rest on the etched oxide layers 8 and be located in a frame structure 11 of the micromechanical device 12.

In the embodiments set forth previously, the deflection of the fixed combs via the pads is designed such that the pad is tilted upon force impact, and the fixed combs suspended via torsion springs are thus tilted. In this type of deflection, a mandrel acting on the pad for force transmission may shift. If the pad is too small and/or the deflection too great and/or the adjustment of the mandrel for force impact too inaccurate, the mandrel may leave the pad. Then there is the risk that particles form through the friction of the mandrel, which may interfere with the functioning of the micromechanical device.

Figure 12A:
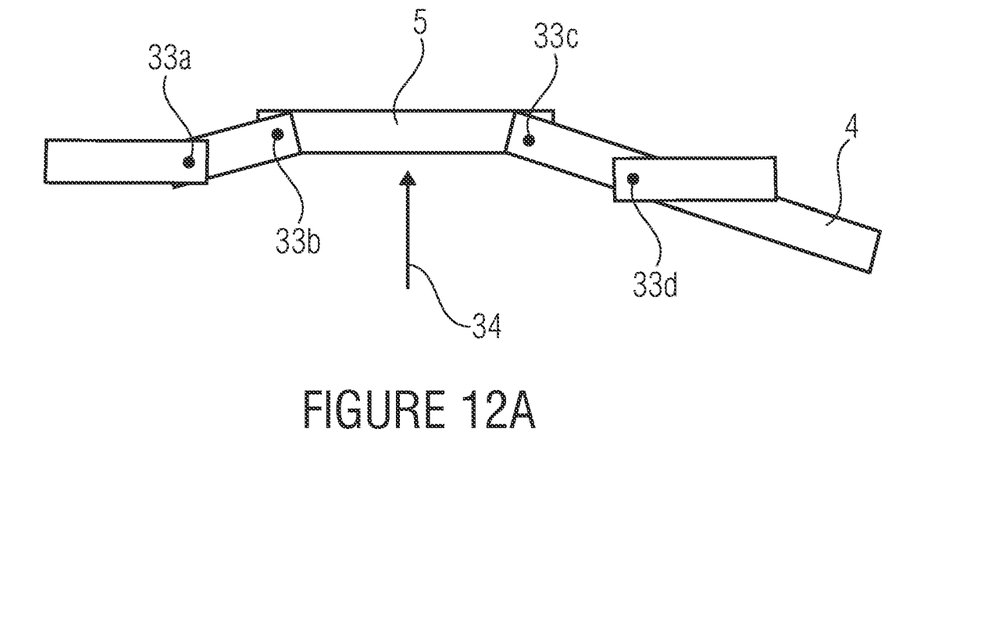
FIG. 12a is a cross-sectional illustration of a pad suspended via torsion springs, which may be shifted in parallel by a pull in the hinges provided to this end.
Figure 12B:
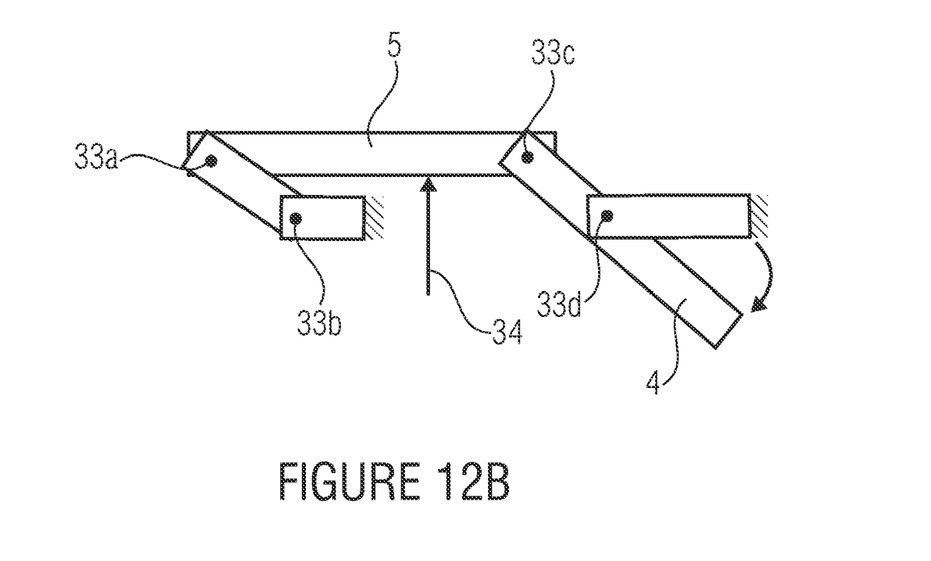
FIG. 12b is a further cross-sectional illustration of a pad suspended via torsion springs, which can be shifted in parallel.

The suspension of the pad may hence be designed so that a pure translation of the pad takes place and this translation may be converted to a tilt of the fixed combs by a spring mechanism. In FIGS. 12a and 12b, as further embodiments of the present invention, such a pad is shown in a cross-sectional illustration. By a power entry on a pad 5, illustrated by an arrow 34, the pad 5 suspended via torsion springs 33a to 33d may be shifted in parallel upwardly out of the chip plane. The fixed comb 4 may be connected to the pad 5 via a spring mechanism. In a parallel shift of the pad 5, the fixed comb 4 then is deflected in the direction of the force input. By a suitable spring mechanism and/or pull in the hinges, the fingers of the fixed comb may also be deflected upwardly, if necessary.

Figure 13:
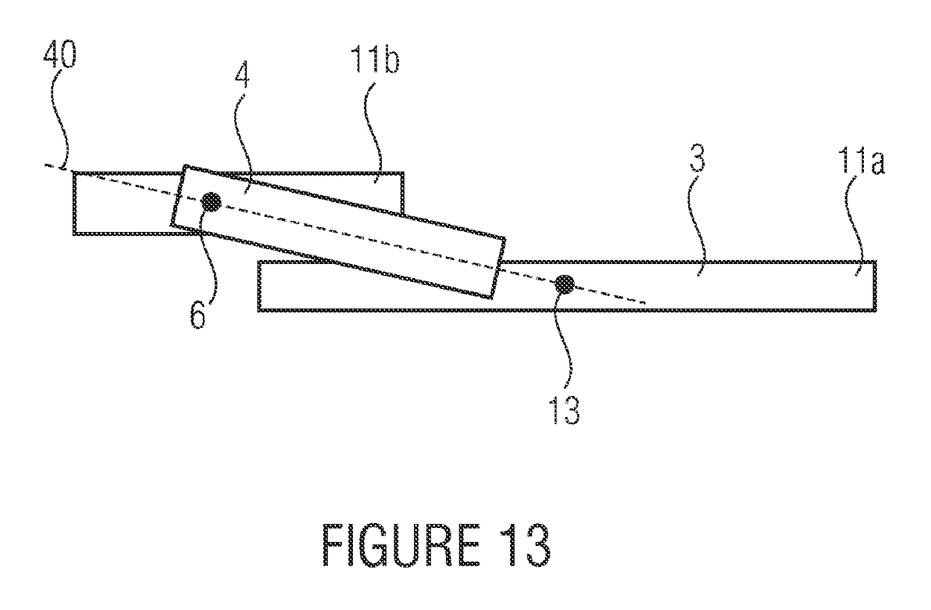
FIG. 13 is a cross-sectional illustration of fixed electrode comb structure and a rotatable electrode comb structure in two substrate planes according to another embodiment of the present invention.

Instead of realizing fixed and movable electrode combs in one layer and/or frame structure, these may also be produced in several layers lying parallel to each other. To this end, the above-mentioned SOI wafers, multiple-SOI wafers or deposited layers combined with sacrificial layers may be used. The layers may here have equal or different thicknesses. A basic construction is illustrated in the cross-sectional illustration of FIG. 13. In the bottom layer and/or frame structure 11a, there is shown in cross-section one finger of a movable comb 3, which extends to the left and right of the torsion axis 13 of the plate. In the top layer 11b, the fixed comb 4 is realized. There is illustrated a finger 4 of the fixed comb, which was tilted out of the top layer in the direction of the bottom layer. The suspension and the tilt 6 are chosen so that the finger 4 of the fixed comb has virtually rotated about the torsion axis 13 of the plate. This is indicated by the auxiliary line 40. It may be achieved thereby that the course of the capacity change between the movable and the fixed combs 3 and 4 may again be kept almost constant in the working range of the device.

For the quasi-static of resonant operation of a micromechanical device according to a further embodiment of the present invention, the micromechanical device may further comprise means for providing a varying voltage. These means may include trace feeds, pads and circuits suited to apply the corresponding voltages to the comb electrodes. These means may also include a control device, by which periodic voltages having a frequency necessary for the proper operation of the micromechanical functional structure can be applied to the comb electrodes in the resonant case. The control device may further comprise means for detecting the zero crossings of the micromechanical functional structure oscillating about the main axis. Furthermore, the micromechanical device may serve as a sensor and use the above means for detecting a movement of a micromechanical functional structure.

Instead of the torsion springs, also flexion springs may be used for the suspension of the fixed combs. It may also be possible with flexion springs to design the suspension so that the tilting axis of the fixed combs passes closely to the torsion axis of the plate. In general, by the embodiments of a micromechanical device according to the present invention illustrated in the embodiment, a multiplicity of embodiments and possible applications result.

Additional comb electrode structures may be arranged on the micromechanical functional structure, for example the plate. In contrast to the above embodiments, the mechanical functional structure may be suspended two-dimensionally in rotatory manner, such that the micromechanical functional structure, e.g. a mirror plate, can be deflected in two directions and shifted translatorily. Likewise, in such a structure, the rotation axes may be rotated with respect to each other by 90 degrees. The rotation axes may be rotated with respect to each other by an arbitrary angle. As a special case, e.g. a rotatorily constructed, two-dimensional structure may comprise collinear axes, wherein particularly a greater deflection angle may be achieved by the collinear axes. A two-dimensional, rotatorily deflectable micromechanical functional unit may be designed such that one of the deflection movements is achieved with another action principle, e.g. with a magnetic, piezoelectric, thermal or acoustic action principle. Here, the two deflection possibilities in two dimensions may both be quasi-static or resonant, or one deflection quasi-static and the other deflection resonant.

Furthermore, a micromechanical device, which is rotatorily deflectable in two dimensions, may be realized in one direction via an electrostatic comb drive, as it is illustrated in EP 1 123 526 A, for example.

The micromechanical device may for example be rotatorily deflectable in one or two dimensions, wherein at least one deflection direction is operated with the tilted comb arrangement described in the embodiments and comprises additional diffractive elements on or in the micromechanical functional structure and/or additional highly reflective mirrorings. These may be diffractive optical elements (DOE), gratings, metallic mirrorings, dielectric mirrorings, annealed metallic mirrorings, or the like.

As described above in the embodiments, the combs can be deflected by one or more mandrels, depending on design and structuring of the micromechanical device, in arbitrary directions out of or below the chip plane, which is given by the rest position of the mirror plate and the frame structure. The deflection of the combs may, in particular, take place so that all combs are deflected upwardly, all downwardly, symmetrically to an axis through the device center, or point-symmetrically to the device center, or completely asymmetrically.

The micromechanical device may comprise a control device or be driven by a control device, so that the movement of the micromechanical functional structure that can be generated follows a ramp with quick reverse motion. The control device may be formed such that, by the electrostatic comb drive, a linear translatory motion functionally described by $z(t)=C1 \times t$ develops, wherein the exact linear functional connection between deflection z and time t is given by a constant $C1$. By analogy, the electrostatic comb drive may be controlled such that a linear rotatory movement having an angular deflection of $\phi(t)=C2 \times t$ results. The deflection angle $\phi$ thus is directly proportional to the deflection time t of the rotatory movement.

The micromechanical functional structure, e.g. the scanner mirror, may also comprise a form of motion adapted to the application, so that linear motion of a laser spot deflected by a scanner mirror takes place on a viewer's screen. The control for the application of a corresponding voltage to the tilted electrode combs of the present invention may also be such that the back and forth motion of a laser spot deflected by the scanner mirror takes place at different or equal speed, wherein the reversal points of the back and forth motion are faded out on the screen.

The tilted comb electrodes and the possibilities for translatory movement by a corresponding control device may also be used for exact optical path length modulation in optical devices. The optical path length modulation may take place both translatorily and rotatorily. The translatory movement by the tilted comb structure may also be used for enlargement of the optical path length of an apparatus. The micromechanical functional structure may for example also be moved translatorily in one or two dimensions, wherein the movement is operated with the tilted comb arrangement in at least one direction, wherein additional diffractive elements are arranged in the micromechanical device. For example, these may be DOEs, gratings, metallic mirrorings, dielectric mirrorings, annealed metallic mirrorings or others. The micromechanical device according to the present invention may be used for the optical path length modulation for confocal microscopes, for Fourier-transform spectrometers and/or for adjusting the resonator length in lasers, for selection and/or variation of the laser wavelength. Arrangements of a linear or two-dimensional array constructed of one- or two-dimensional translatory or rotatory elements according to the present invention also is possible.

The micromechanical functional structure may be a mirror plate mirrored both on the front and the backside.

Micromechanical devices realizing a combination of the introduced approach with the tilted comb structures with other principles of action, which are operated quasi-statically, resonantly, translatorily or rotatorily, are also possible.

As already mentioned in the embodiments, for producing the micromechanical device according to the present invention, a SOI wafer may be used for definition of the layer thickness. As has been described above, there are several methods to deflect and fix the electrode combs. For the production of the micromechanical device, there may be employed methods in which locally thinned areas, for example along the main axis, are used to achieve reduced spring stiffness. In the production of the micromechanical devices on SOI wafers, open trenches and/or filled trenches may be used for the definition of the areas electrically insulated from each other. The comb electrode pairs according to the present invention may be produced in a method e.g. in different substrate layers and/or frame structure layers.

The micromechanical devices may comprise, for feeding further electrical potentials, multiple springs or metallic traces via springs or highly doped areas in a weakly doped substrate. In the micromechanical device, fingers of an electrode comb may be attached at the torsion spring or at a device area that is stiffer than the torsion spring. The fixed comb structures with their fingers and the movable comb structures with their fingers may be formed in different substrate or frame layers. Moreover, instead of torsion springs, flexion springs may be employed, which have contact areas or pads upon which force impact may take place for deflection of the fixed combs, or that can be shifted in parallel via a four-bar linkage.

In one embodiment, the micromechanical device may for example be employed for projection of an image.

In a further embodiment, the micromechanical device is employed for positioning a light or laser beam. It is also possible that the micromechanical device is employed for deflection of light and/or laser beams, wherein the radiation source is operated continuously or in pulsed manner.

The micromechanical device may be formed in different substrates, such as silicon, gallium arsenide, indium phosphide, gallium nitride, silicon carbide, or other substrates. The actor layer may be polymeric or monocrystalline.

For producing the micromechanical devices, the fabrication technologies may be kept simple, high temperatures may be avoided, which may destroy conductors or traces or mirrorings of the micromechanical functional structure. All mechanically loaded elements may consist of materials having excellent elastomechanical properties, which do not degrade even upon irradiation of light as well as varying temperature and air humidity.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A micromechanical device, comprising:
   a micromechanical functional structure, which can be deflected about a main axis from a rest position;
   a movable electrode, which is mounted to the micromechanical functional structure; and
   a fixed electrode, which can be tilted about a tilting axis with respect to the movable electrode in the rest position, wherein the tilting axis is parallel to the main axis or is identical with the main axis.

2. The micromechanical device according to claim 1, wherein the movable electrode and the fixed electrode are formed as comb electrodes.

3. The micromechanical device according to claim 1, wherein the fixed electrode is tilted upward or downward with respect to a plane in which the micromechanical functional structure is arranged in the rest position.

4. The micromechanical device according to claim 1, with a plurality of electrode pairs, each including a movable electrode and a fixed electrode, wherein two electrode pairs each are arranged on one side of the micromechanical functional structure.

5. The micromechanical device according to claim 4, wherein the fixed electrodes of the electrode pairs are tilted in the same direction or in opposite directions.

6. The micromechanical device according to claim 1, with a tilter for tilting the fixed electrode.

7. The micromechanical device according to claim 6, wherein the tilter includes an external or internal micromanipulator acting on the fixed electrode.

8. The micromechanical device according to claim 7, wherein the fixed electrode includes a pad with which the micromanipulator is in contact.

9. The micromechanical device according to claim 7, wherein the micromanipulator includes a mandrel and/or an integrated actor.

10. The micromechanical device according to claim 1, with a fixing, which fixes the fixed electrode in the tilted location.

11. The micromechanical device according to claim 10, wherein the fixing includes a glue, a solder, a metal, a plastic, a bond connection or a mechanical arrangement.

12. The micromechanical device according to claim 1, with a frame on which the micromechanical functional structure with the movable electrode and the fixed electrode is mounted.

13. The micromechanical device according to claim 12, with a beam via which the micromechanical functional structure and the movable electrode are connected to the frame.

14. The micromechanical device according to claim 13, wherein a part of the beam comprises reduced thickness as compared with the rest of the beam, to define a torsion spring.

15. The micromechanical device according to claim 13, wherein the beam comprises a meander-shaped structure, so that the micromechanical functional structure can be deflected translatorily perpendicular to the main axis.

16. The micromechanical device according to claim 1, wherein the micromechanical functional structure is an optical functional structure.

17. The micromechanical device according to claim 16, wherein the micromechanical functional structure is a one- or two-dimensional micro-mirror.

18. The micromechanical device according to claim 1, with a voltage source for applying a periodic signal with a predetermined frequency between the movable electrode and the fixed electrode.

19. The micromechanical device according to claim 18, wherein the signal is a voltage signal.

20. The micromechanical device according to claim 1, which is employed for image projection.

21. The micromechanical device according to claim 1, which is employed for positioning a light or laser beam.

22. The micromechanical device according to claim 1, which is employed for the deflection of light and/or laser beams, wherein the radiation source is operated continuously or in pulsed manner.

23. The micromechanical device according to claim 1, wherein the micromechanical functional structure can be deflected in quasi-static manner.

* * * * *